(12) United States Patent
Lee et al.

(10) Patent No.: US 11,489,569 B2
(45) Date of Patent: Nov. 1, 2022

(54) UPDATE MMW CODEBOOK FOR SMART PHONE COVER CHANGE

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Brian Clarke Banister, San Diego, CA (US); Raghu Narayan Challa, San Diego, CA (US); Ruhua He, San Diego, CA (US); Daniel Amerga, San Diego, CA (US); Subashini Krishnamurthy, San Diego, CA (US); Scott Hoover, Del Mar, CA (US); Sandeep Rao, San Diego, CA (US); Zhang Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 50 days.

(21) Appl. No.: 16/986,135

(22) Filed: Aug. 5, 2020

(65) Prior Publication Data
US 2021/0044336 A1     Feb. 11, 2021

Related U.S. Application Data

(60) Provisional application No. 62/883,565, filed on Aug. 6, 2019.

(51) Int. Cl.
*H04L 5/00* (2006.01)
*H04B 7/0456* (2017.01)
(Continued)

(52) U.S. Cl.
CPC ........ *H04B 7/0482* (2013.01); *H04M 1/7246* (2021.01); *H04W 76/19* (2018.02); *H04L 5/0023* (2013.01)

(58) Field of Classification Search
CPC .. H04B 7/0639; H04B 7/0456; H04B 7/0478; H04B 7/0452; H04B 7/0469;
(Continued)

(56) References Cited

U.S. PATENT DOCUMENTS 9,762,710 B2    9/2017   Lee et al.
9,813,532 B2    11/2017  Kim et al.
(Continued)

FOREIGN PATENT DOCUMENTS

CN    109547047 A    3/2019
WO    2015108237 A1  7/2015
(Continued)

OTHER PUBLICATIONS

International Search Report and Written Opinion—PCT/US2020/045278—ISA/EPO—dated Nov. 6, 2020.

*Primary Examiner* — Eva Y Puente
(74) *Attorney, Agent, or Firm* — Arent Fox LLP /Qualcomm Incorporated

(57) ABSTRACT

Aspects presented herein enable updating the codebook configuration upon the changing of the cover or case of the UE. The apparatus applies a first codebook from a plurality of preconfigured codebooks. The apparatus detects a change of a cover state of the UE, wherein the change alters a transmission beam pattern at the UE. The apparatus applies a second codebook from the plurality of preconfigured codebooks based on the change of the cover state.

26 Claims, 11 Drawing Sheets

(51) Int. Cl.
*H04W 76/19* (2018.01)
*H04M 1/7246* (2021.01)

(58) Field of Classification Search
CPC .. H04B 7/0626; H04B 7/0617; H04B 7/0482; H04B 7/0417; H04B 7/024; H04B 7/0619; H04B 7/0634; H04L 25/0204; H04L 5/0048; H04L 1/0026; H04L 25/021; H04L 25/03343; H04L 1/06; H04L 25/0242; H04L 12/18; H04L 1/0029; H04L 25/0224; H04L 25/03891; H04L 5/1469; H04W 72/042; H04W 48/16; H04W 24/10; H04W 48/12; H04W 72/0446; H04W 72/1226; H04W 84/18; H04W 16/14; H04W 24/08; H04W 36/02; H04W 56/0005; H04W 68/04; H04W 72/02
USPC .......................................................... 375/267
See application file for complete search history.

(56) References Cited

U.S. PATENT DOCUMENTS

| | | | |
|---|---|---|---|
| 9,872,296 B2* | 1/2018 | Raghavan | H04B 7/0617 |
| 9,929,763 B1 | 3/2018 | Zheng et al. | |
| 10,015,294 B2 | 7/2018 | Lee et al. | |
| 10,224,608 B2 | 3/2019 | Lee et al. | |
| 10,468,752 B2 | 11/2019 | Jung et al. | |
| 10,516,772 B2 | 12/2019 | Lee et al. | |
| 10,819,010 B2 | 10/2020 | Lee et al. | |
| 11,050,863 B2 | 6/2021 | Lee et al. | |
| 2009/0298424 A1* | 12/2009 | Liu | H04B 7/0639 |
| | | | 455/39 |
| 2014/0187281 A1 | 7/2014 | Faraone et al. | |
| 2014/0252786 A1 | 9/2014 | Singhal | |
| 2014/0315592 A1 | 10/2014 | Schlub et al. | |
| 2016/0327634 A1 | 11/2016 | Katz et al. | |
| 2017/0290011 A1 | 10/2017 | Kushnir et al. | |
| 2017/0358838 A1 | 12/2017 | Huang et al. | |
| 2018/0041261 A1* | 2/2018 | Modarres Razavi | |
| | | | H04B 7/0617 |
| 2018/0287651 A1 | 10/2018 | Fernando et al. | |
| 2020/0195310 A1* | 6/2020 | Abedini | H04B 7/0456 |
| 2020/0358512 A1* | 11/2020 | Zhan | H04B 7/0695 |
| 2020/0396693 A1 | 12/2020 | Kim et al. | |
| 2021/0242919 A1* | 8/2021 | Park | H04B 7/0491 |
| 2021/0274027 A1 | 9/2021 | Lee et al. | |
| 2021/0282097 A1 | 9/2021 | Imana | |
| 2022/0210746 A1 | 6/2022 | Kim | |

FOREIGN PATENT DOCUMENTS

| | | |
|---|---|---|
| WO | 2016178786 A1 | 11/2016 |
| WO | 2019126220 A1 | 6/2019 |
| WO | 2020252347 | 12/2020 |

* cited by examiner

UPDATE MMW CODEBOOK FOR SMART PHONE COVER CHANGE

CROSS-REFERENCE TO RELATED APPLICATION(S)

This application claims the benefit of U.S. Provisional Application Ser. No. 62/883,565, entitled "UPDATE MMW CODEBOOK FOR SMART PHONE COVER CHANGE" and filed on Aug. 6, 2019, the contents of which are expressly incorporated by reference herein in their entirety.

BACKGROUND

Technical Field

The present disclosure relates generally to communication systems, and more particularly, to updating a codebook for a User Equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

UEs that support mmW may be configured to support beam management of mmW transmissions, due to mmW transmission being highly sensitive. As such, the radio frequency (RF) component of the UE and the layer 1 software of the NR modem may be configured with proper beam configurations. The beam configurations may include, for example, a set of beam patterns (e.g., $\{B(1), B(2), \ldots B(n)\}$) or a configuration for each specific beam (e.g., $\{C(1), C(2), \ldots C(n)\}$). The configuration of each of the beams may also be known as a codebook. The configuration of the codebook may depend on many different factors. A cover or case placed on the UE may affect mmW transmissions and may lead to decreased performance of the UE. A UE may blindly cycle through codebooks to attempt to determine a suitable codebook. This blind codebook selection may lead to an increase in the implementation complexity as well as an increase in signaling overhead. Aspects presented herein provide a solution to the problem of performance degradation due to codebook configuration affects caused by placing a cover or case on the UE or changing a cover/case of the UE.

In an aspect of the disclosure, a method, a computer-readable medium, and an apparatus are provided. The apparatus applies a first codebook from a plurality of preconfigured codebooks. The apparatus detects a change of a cover state of the UE, wherein the change alters a transmission beam pattern at the UE. The apparatus applies a second codebook from the plurality of preconfigured codebooks based on the change of the cover state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
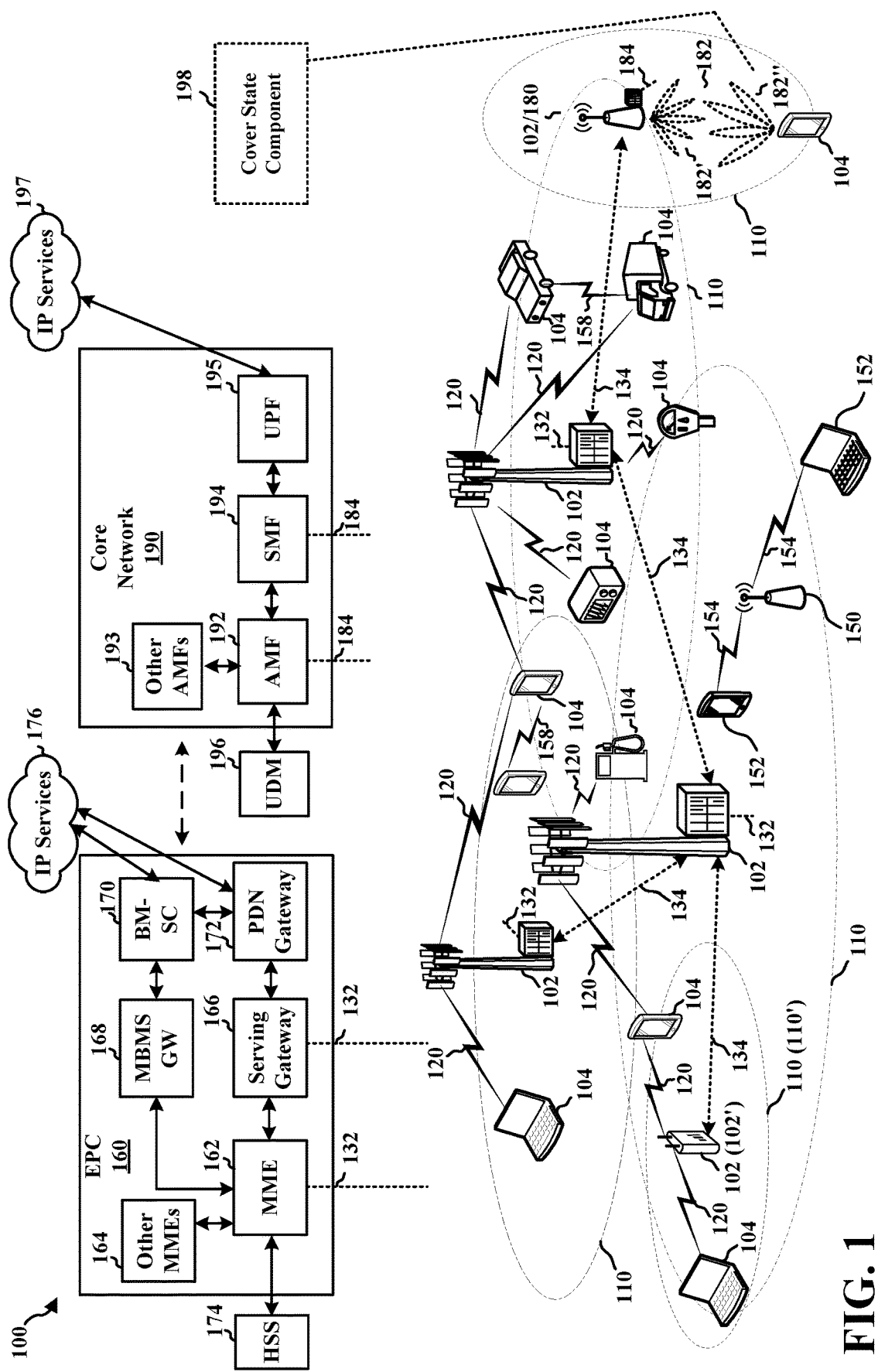
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to detect a change of a cover state of a UE. For example, the UE 104 of FIG. 1 includes a cover state component 198 configured to detect the change of the cover state of the UE, where the change may alter a transmission beam pattern at the UE. The UE may apply a first codebook from a plurality of preconfigured codebooks. The UE may be configured to apply a second codebook from the plurality of preconfigured codebooks based on the change of the cover state.

Although the following description may be focused on 5G NR, the concepts described herein may be applicable to other similar areas, such as LTE, LTE-A, CDMA, GSM, and other wireless technologies.

Figure 2:
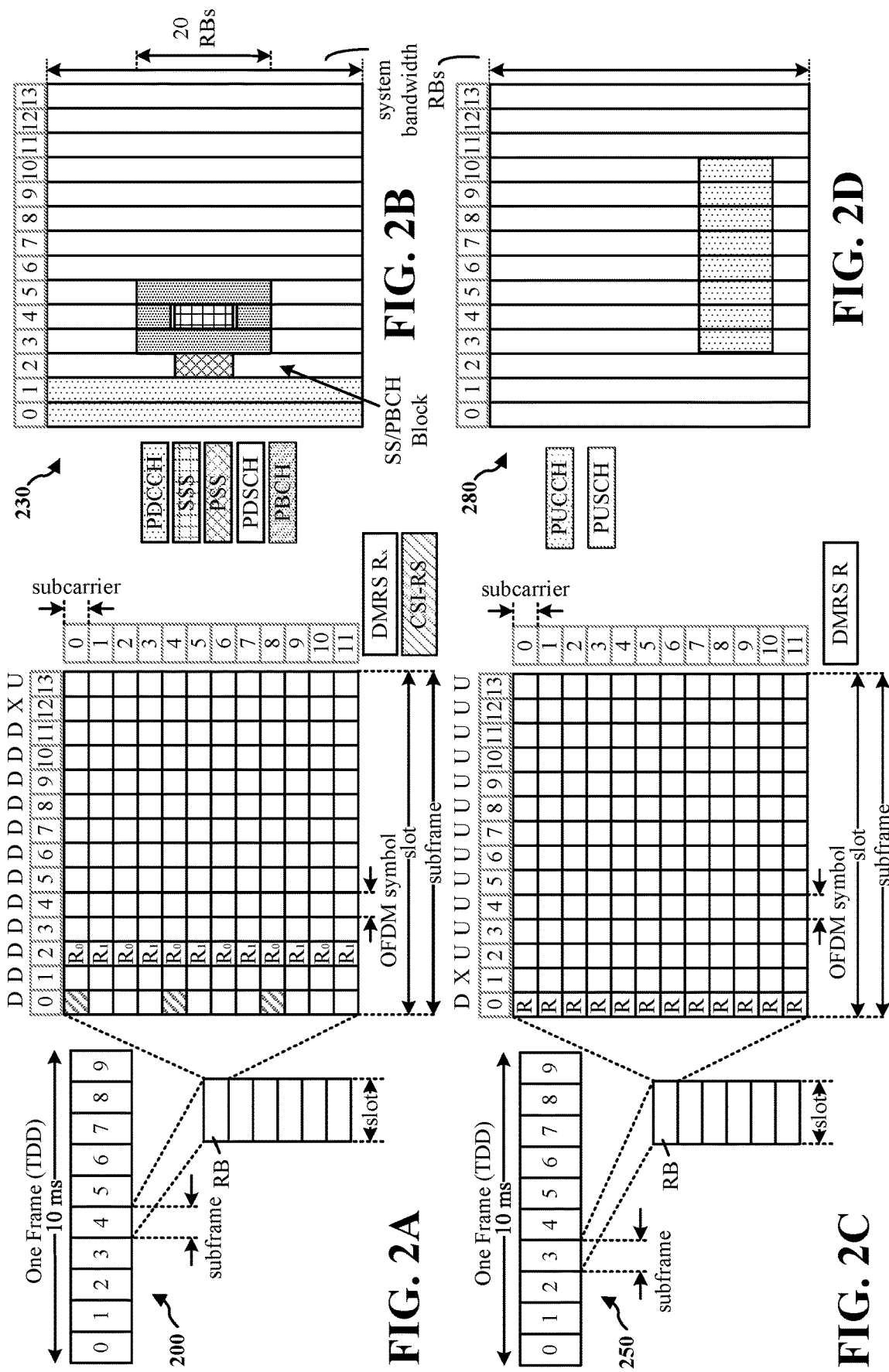
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
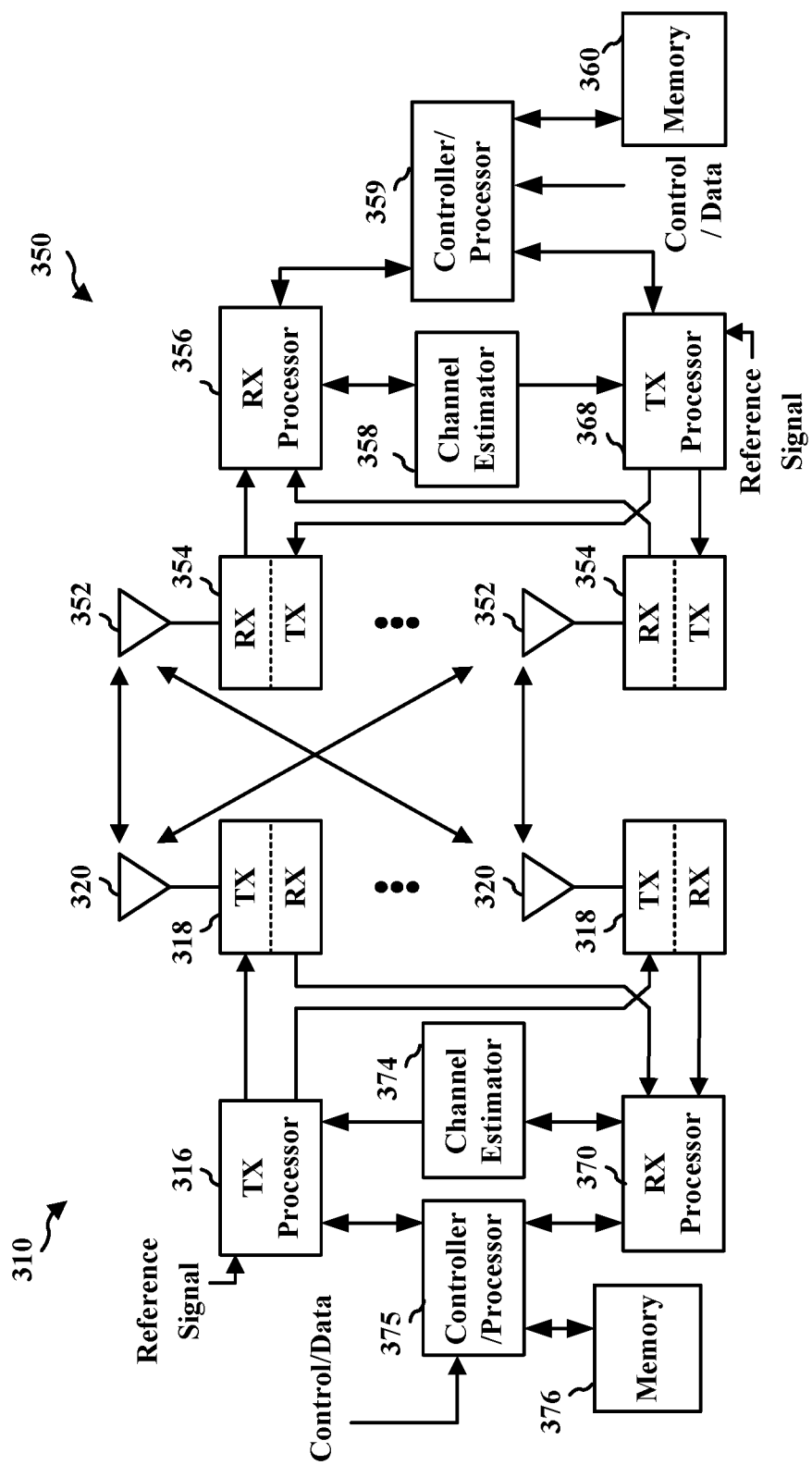
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Wireless communication may use millimeter wave (mmW) frequencies (e.g., frequency range 2 (FR2)). As one example, 5G NR communication support communication using mmW frequencies. Such communication may be configured to operate in a non-standalone (NSA) mode and/or a standalone (SA) mode. Such communication may be based on multiple radio access technologies (RATs). For example, 5G NSA mode utilizes evolved terrestrial radio access network (E-UTRAN) new radio dual connectivity (ENDC) along with evolved packet core (EPC). UEs supporting ENDC may connect simultaneously to a master node base station (e.g., LTE base station) and a 5G NR secondary node (e.g., 5G base station). As another example, 5G SA mode may utilize NR and a 5G core network (5GC) (e.g., core network 190), such that the UE may be served entirely by 5G NR. Both NSA and SA mode may be configured to support frequencies (e.g., FR2).

UEs that support mmW may be configured to support beam management of mmW transmissions, due to mmW transmission being highly sensitive. As such, the RF component of the UE and the layer 1 software of the NR modem may be configured with proper beam configurations. The beam configurations may include, for example, a set of beam patterns (e.g., $\{B(1), B(2), \ldots B(n)\}$) or a configuration for each specific beam (e.g., $\{C(1), C(2), \ldots C(n)\}$). The configuration of each of the beams may also be known as a codebook. The configuration of the codebook may depend on many different factors. A cover or case of the UE may affect the effectiveness of the codebook configuration. When a cover or case is placed on the UE, the cover may reduce or possibly stop mmW transmission and/or reception, which may affect the effectiveness of the codebook configuration applied at the UE. Thus, a cover/case may degrade performance of the UE, such that the UE may need to replace the codebook. Aspects presented herein enable a UE to select and apply a new codebook based on the change of the case or cover of the UE in order to avoid negative impacts on the mmW transmission/reception and to avoid increased block error rate (BLER) at the network.

Figure 4:
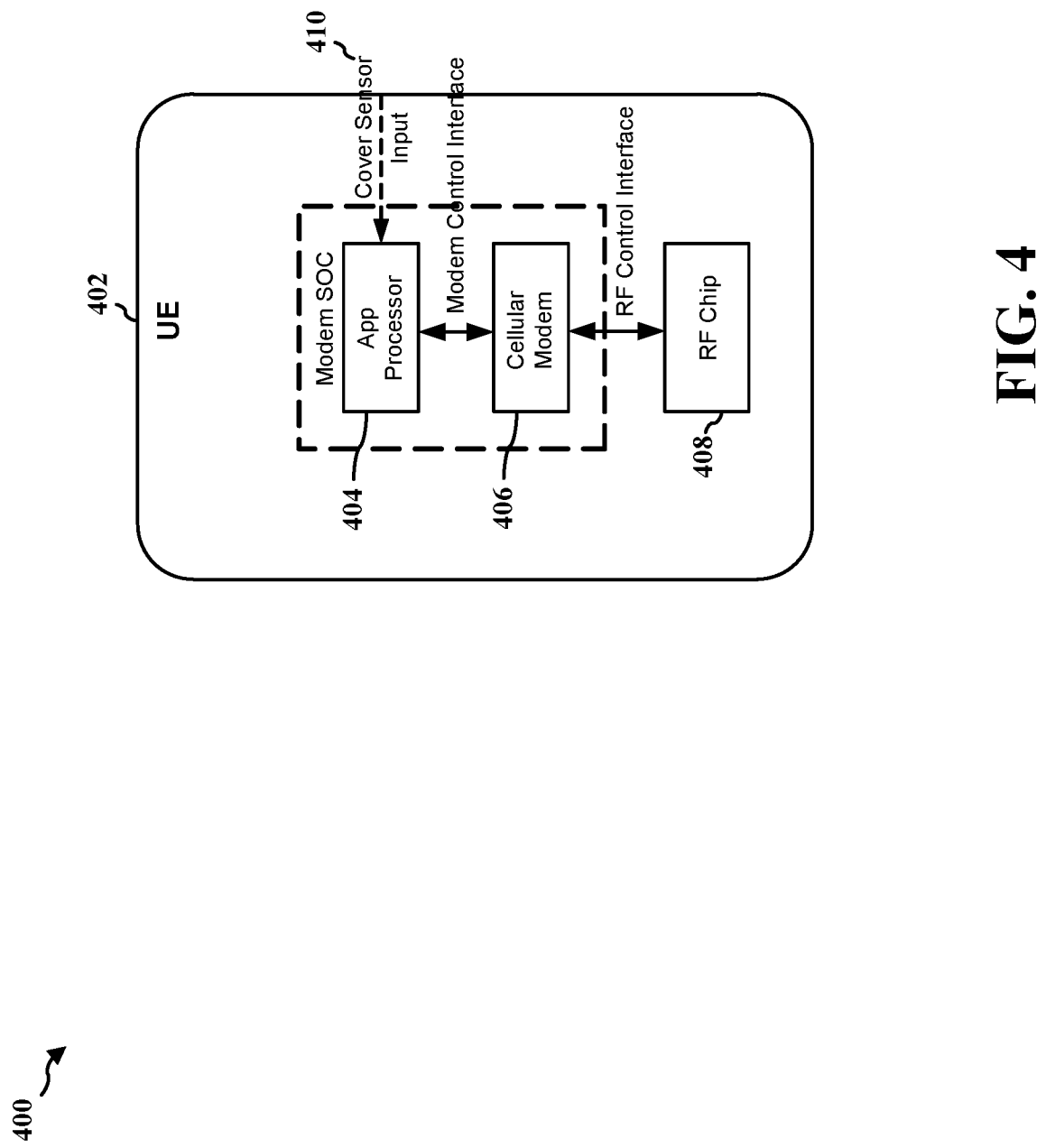
FIG. 4 is a diagram of a UE in accordance with certain aspects of the disclosure.

FIG. 4 is a diagram 400 of a UE 402 in accordance with certain aspects of the disclosure. UE 402 may comprise a smart phone, or other examples of a UE described in connection with FIG. 1. UE 402 comprises an application processor 404, a cellular modem 406, an RF chip or component 408, and may further comprise a cover sensor input 410. The application processor 404 and the cellular modem 406 communicate using the modem control interface. The cellular modem 406 and the RF chip or component 408 communicate using the RF control interface. When a user changes the cover or case of the UE, such change may affect the codebook configuration of the UE. As used herein, the term cover may also refer to a case. The term cover and the term case correspond to an added layer configured to at least partially surround a housing of a UE. A cover/case may be configured to provide added protection for the UE. A cover/case may comprise various different materials and may have various different shapes, sizes, thicknesses, etc. A cover/case may comprise decorative features, added utility features, etc. A cover change may involve placing a cover on a UE that was not previously placed in a cover. In another example, the change may involve removing a first cover and replacing it with a second cover.

UEs may be provisioned, by the manufacturer, with a set of codebook configurations (e.g., $\{C^{(k)}(i)\}$: $k=1, \ldots, m$) at the cellular modem 406 and at the RF chip or component 408. In some aspects, each of the codebook configurations in the set of codebook configurations may be associated with one or more covers or cases that may be used with the UE. For example, the performance of the UE using a number of covers may be examined or tested in advance in order to determine an appropriate codebook for the particular covers or cases. The codebooks for different covers may be provisioned in the cellular modem 406 and the RF component 408 of the UE by the manufacturer, as one example. In other examples, a UE may receive codebook information after manufacture. The ongoing ability to receive codebook information corresponding to particular covers may enable the UE to be provided with such codebook information for covers that are created after the manufacture of the UE.

When a change occurs in the cover of the UE, e.g., a cover is added, removed or changed, the UE may be configured to detect the change and determine a corresponding codebook configuration, such that the UE may update the codebook in order to reduce effects of the cover change on mmW communication.

The UE may detect the change of the cover or case of the UE based on an input or indication received by the application processor 404 from a cover sensor (not shown). The application processor 404 may receive a cover sensor input 410 when the state of the cover of the UE has changed. For example, the cover sensor input may indicate a change from a first cover to a second cover, a change from no cover to a cover, as well as a change from a cover to no cover. In some aspects, covers may include identifying features that can be read or detected by the application processor 404, such that the application processor 404 may detect that the state of the cover of the UE has changed. The application processor 404, based on the cover sensor input 410, may determine the corresponding codebook based on the change of the cover state. The application processor 404 may indicate the codebook configuration (e.g., index k in (1, . . . , m)) to the cellular modem 406 via the modem control interface. The cellular modem 406 may then configure the RF component 408 to use the new codebook based on the codebook configuration received from the application processor 404.

There may be many different instances in which the codebook may be updated in response to a change of the cover state of the UE. Table 1, shown below, includes some instances in which the codebook may need to be updated. The disclosure is not intended to be limited to the examples disclosed herein. There may be many other instances, not listed in Table 1, in which the codebook may need to be updated. For example, the UE may be LTE connected with ENDC with or without FR2. In addition to determining to change a codebook, the UE may determine when and how to apply the codebook change. The determination may depend on any of a number of factors, e.g. NSA/SA mode, RAT, connected/idle state, FR1/FR2, RLF, GWT, USIM removal, power cycle, PCell/Scell configuration, etc.

TABLE 1

| Case No. | Scenario when receiving QMI command which needs to change codebook | 5G Mode | UE Handling |
|---|---|---|---|
| 1a | In LTE connected with ENDC with FR2 | NSA | Trigger SCG RLF and when the NR is reconfigured back apply the new codebook |
| 1b | In LTE connected with ENDC without FR2 | NSA | Store codebook change and apply the next time when FR2 is added or connected |
| 2 | In RLF with ENDC with FR2 | NSA | When the NR is reconfigured back, apply the new codebook |
| 3 | In LTE idle | NSA, SA | Store codebook change and apply the next time when FR2 is added or connected |
| 4 | Camped on 5G NR cell; RRC idle or inactive | SA | Store codebook change and apply the next time when FR2 is added or connected |
| 5a | Connected in 5G NR cell with FR2 on PCell | SA | Trigger RLF and when the NR is re-established on FR2 apply the new codebook |
| 5b | Connected in 5G NR cell without FR2 | SA | Store codebook change and apply the next time when FR2 is added as SCell, MRDC, or HO to FR2 |
| 6 | RLF | SA | When the NR is reestablished on FR2, apply the new codebook |
| 7 | InGWT | SA, NSA | Same as #3 |
| 8 | USIM removal, LPM, detach, deregister | SA, NSA | Same as #3 |
| 9 | Across power cycle | SA, NSA | Not store codebook change assuming HLOS will send codebook again when boot up |
| 10 | In LTE connected mode, ENDC without FR2, or SA without FR2; measurement on NR FR2 is not configured | NSA, SA | Store codebook change and apply when measurment task of NR FR2 is configured |
| 11 | In LTE connected mode, ENDC without FR2, or SA without FR2; measurement on NR FR2 is configured | NSA, SA | Suspend measurement, apply new codebook and resume measurement on FR2 |
| 12 | SCell with FR2 in MCG or SCG but PCell/PSCell is not on FR2 | NSA, SA | Trigger vRLF of FR2, apply the new codebook, and recover from vRLF |
| 13 | Connected in 5G NR with NRDC on FR2 | SA | Trigger SCG RLF and when the NR is reconfigured back apply the new codebook |

Some of the instances listed in Table 1 may be grouped or categorized such that the UE may update the codebook in a similar manner across the different scenarios. For example, with reference to Table 1, the UE in case numbers 1b, 2-4, 5b, and 6-10 may be arranged to update the codebook and apply the codebook at a later time. In case numbers 1a, 5a and 13, the UE may be experiencing mmW transmissions/receptions and may be configured to apply the new codebook by implementing a radio link failure (RLF) procedure. In case number 11, the UE may be actively conducting mmW measurements and may be configured to apply the new codebook by suspending the FR2 link. Lastly, in case number 12, the UE may be experiencing mmW transmission/receptions as a SCell and may be configured to apply the new codebook by implementing a virtual radio link failure (vRLF) procedure.

Figure 5:
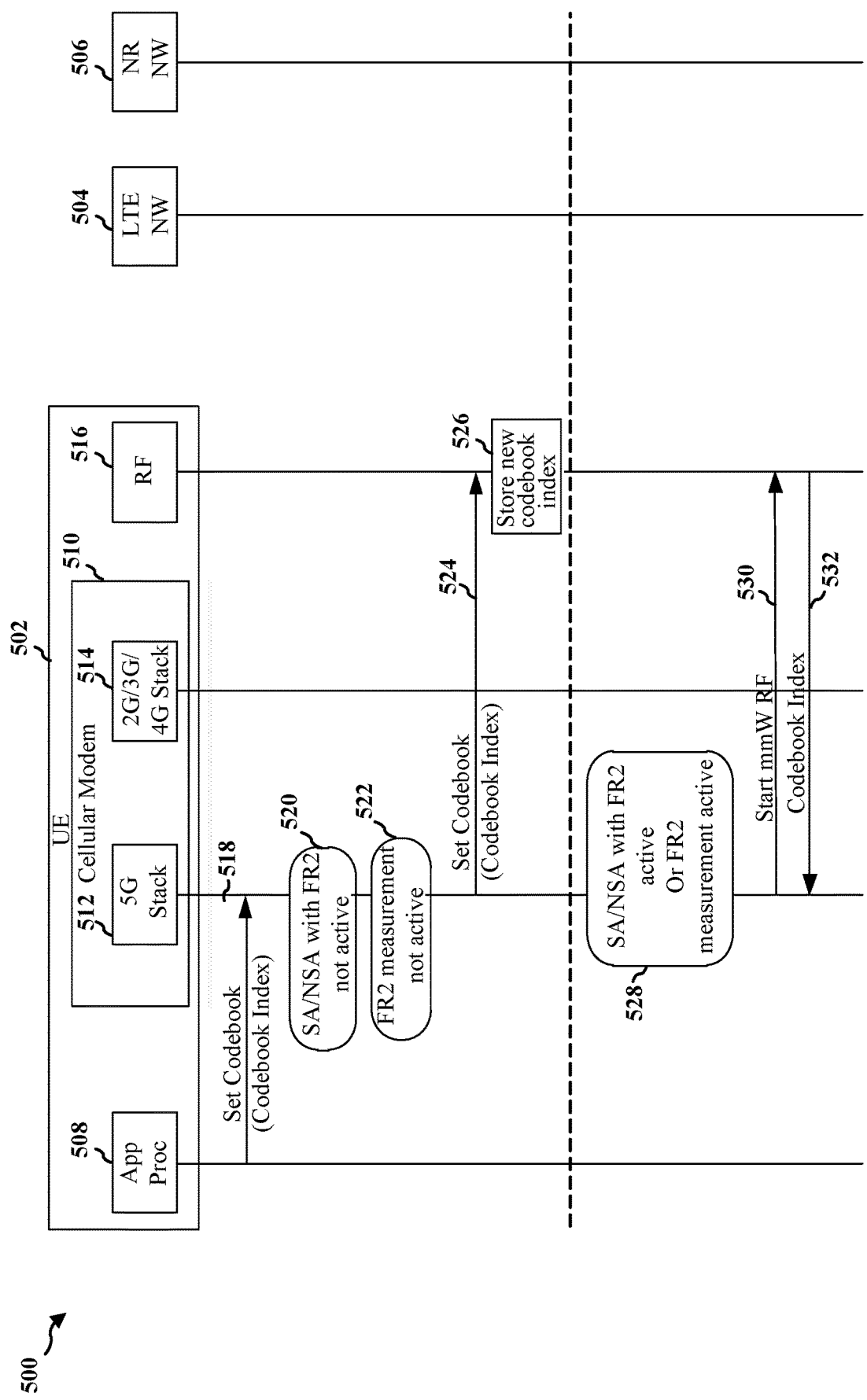
FIG. 5 is a diagram illustrating an example of updating a codebook in accordance with certain aspects of the disclosure.

FIG. 5 is a diagram illustrating an example 500 of a UE updating a codebook. The example 500 of FIG. 5 includes a UE 502, a first network 504 (e.g., LTE network), and a second network 506 (e.g., NR network). The UE 502 includes an application processor 508 and a cellular modem 510 including a 5G stack 512 and a legacy stack 514 (e.g., 2G/3G/4G). The UE 502 further includes an RF component 516. The UE 502 may be the UE in any of case numbers 1b, 2-4, 5b, or 6-10 of Table 1.

In the example of FIG. 5, the UE may be configured to update the codebook, but may determine to apply the codebook at a later time. For example, the UE may delay application of the new codebook until a particular mode of the UE is active. In some aspects, the application processor 508 may update the codebook by providing the codebook or codebook index 518 to the 5G stack 512 of the cellular modem 510. The 5G stack 512 may check, at 520, whether the UE is in SA or NSA mode while the FR2 link is not active. The 5G stack 512 may also check, at 522, whether there are any active measurements of the FR2 link. In instances where the FR2 link is not active and there are no active measurements of the FR2 link, the 5G stack 512 may provide the codebook or codebook index 524 to the RF component 516. The RF component 516, at 526, may store the new codebook received from the 5G stack 512.

The new codebook may be applied the next time an FR2 link is setup for transmissions by the UE. For example, the 5G stack 512 may determine, at 528, when the UE is in SA or NSA mode with the FR2 link active, or when measurement on the FR2 link are active. Upon such occurrence, the 5G stack may send a command to the RF component 516 to start mmW RF 530, at which point the RF component 516 will start to use the codebook stored at 526. The RF component 516 may also be configured to send, to the 5G stack 512 the codebook index 532 for synchronization. The RF component 516 sending the codebook index 532 to the 5G stack 512 may also verify that transmissions are based on the correct codebook.

Figure 6:
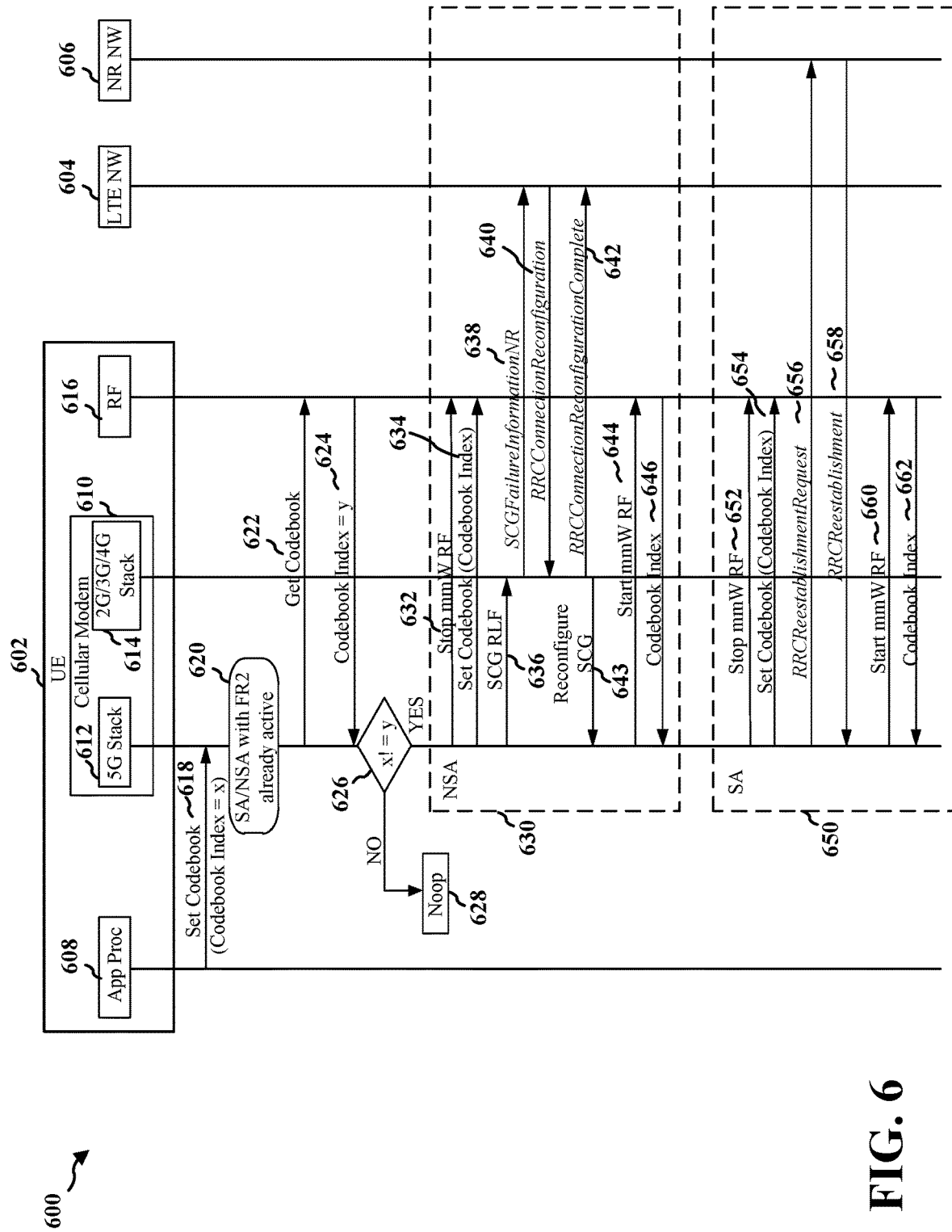
FIG. 6 is a diagram illustrating an example of updating a codebook in accordance with certain aspects of the disclosure.

FIG. 6 is a diagram illustrating an example 600 of a UE updating a codebook. The example 600 of FIG. 6 includes a UE 602, a first network 604 (e.g., LTE network), and a second network 606 (e.g., NR network). The UE 602 includes an application processor 608, a cellular modem 610 including a 5G stack 612 and a legacy stack 614 (e.g., 2G/3G/4G). The UE 602 further includes an RF component 616. The UE 602 may be the UE in any of case numbers 1a, 5a, or 13 of Table 1.

In the example of FIG. 6, the UE may be experiencing mmW transmissions/receptions and may be configured to apply the new codebook by implementing the RLF procedure. In some aspects, the application processor 608 may update the codebook by providing the codebook or codebook index 618 to the 5G stack 612 of the cellular modem 610. In the example, of FIG. 6, the codebook index 618 may be set to a value x. The 5G stack 612 may determine, at 620, that the UE is in SA or NSA mode with the FR2 link already active. The 5G stack 612 may then send a request (e.g., get codebook 622) to the RF component 616 for the current codebook index. The RF component 616 may send the value of the codebook index 624 to the 5G stack 612 in response to the request (e.g., get codebook 622). In the example of FIG. 6, the RF component 616 sends a codebook index 624 having a value of y.

The 5G stack 612, at 626, may determine whether the new codebook index 618 matches the codebook index 624 current being utilized. In some aspects, for example, when the determination at 626 is false, such that the new codebook index 618 and codebook index 624 are the same, then no operation may be performed, at 628, such that the new codebook 618 is not applied. In some aspects, when the determination at 626 is true, such that the new codebook index 618 and codebook index 624 are not the same, then the 5G stack 612 proceeds with applying the new codebook index 618.

In some aspects, for example, when the UE is in the NSA mode 630, the 5G stack 612 may send a command 632 (e.g., stop mmW RF) to the RF component 616 to stop using the mmW RF connection. The 5G stack 612 may follow by providing the updated codebook or codebook index 634 to the RF component 616. The 5G stack 612 may then trigger the RLF procedure in order to implement the new codebook. For example, the 5G stack 612 may send a secondary cell group (SCG) RLF command 636 to the legacy stack 614 (e.g., 2G/3G/4G stack). The legacy stack 614 may send to the LTE network 604 a failure indication (e.g., SCGFailureInformationNR 638) in order to trigger a reconfiguration of the RRC. The LTE network 604, in response to the failure indication (e.g., SCGFailureInformationNR 638) may send to the legacy stack 614 an RRC connection reconfiguration (e.g., RRCConnectionReconfiguration 640) to reconfigure with SCG on the same NR cell or different NR cell. The legacy stack 614 may acknowledge the completion of the RRC connection reconfiguration by sending a RRCConnectionReconfigurationComplete signal 642 to the LTE network 604. The legacy stack 614 may send an indication (e.g., reconfigure SCG 643) to the 5G stack 612 in order to reconfigure the SCG connection. When the SCG is reconfigured, the 5G stack 612 may send a command (e.g., start mmW RF 644) to the RF component 616 to restart communications on the FR2 link. The RF component 616 may also be configured to send, to the 5G stack 612, the codebook index 632 for synchronization. The RF component 616 sending the codebook index 632 to the 5G stack 612 may also verify that transmissions are based on the correct codebook.

In some aspects, for example, when the UE is in the SA mode 650, the 5G stack 612 may send a command 652 (e.g., stop mmW RF) to the RF component 616 to stop using the mmW RF connection. The 5G stack 612 may follow by providing the updated codebook or codebook index 654 to the RF component 616. The 5G stack 612 may then send a request 656 to reestablish the RRC (e.g., RRCRestablishmentRequest) to the NR network 606. The NR network 606 responds by sending an indication 658 to the 5G stack 612 to reestablish the RRC (e.g., RRCReestablishment). The 5G stack 612 may initiate the application of the new codebook by sending a command 660 (e.g., start mmW RF) to the RF component 616 to restart communications on the FR2 link. The RF component 616 may also be configured to send, to the 5G stack 612, the codebook index 662 for synchronization. The RF component 616 sending the codebook index 662 to the 5G stack 612 may also verify that transmissions are based on the correct codebook.

Figure 7:
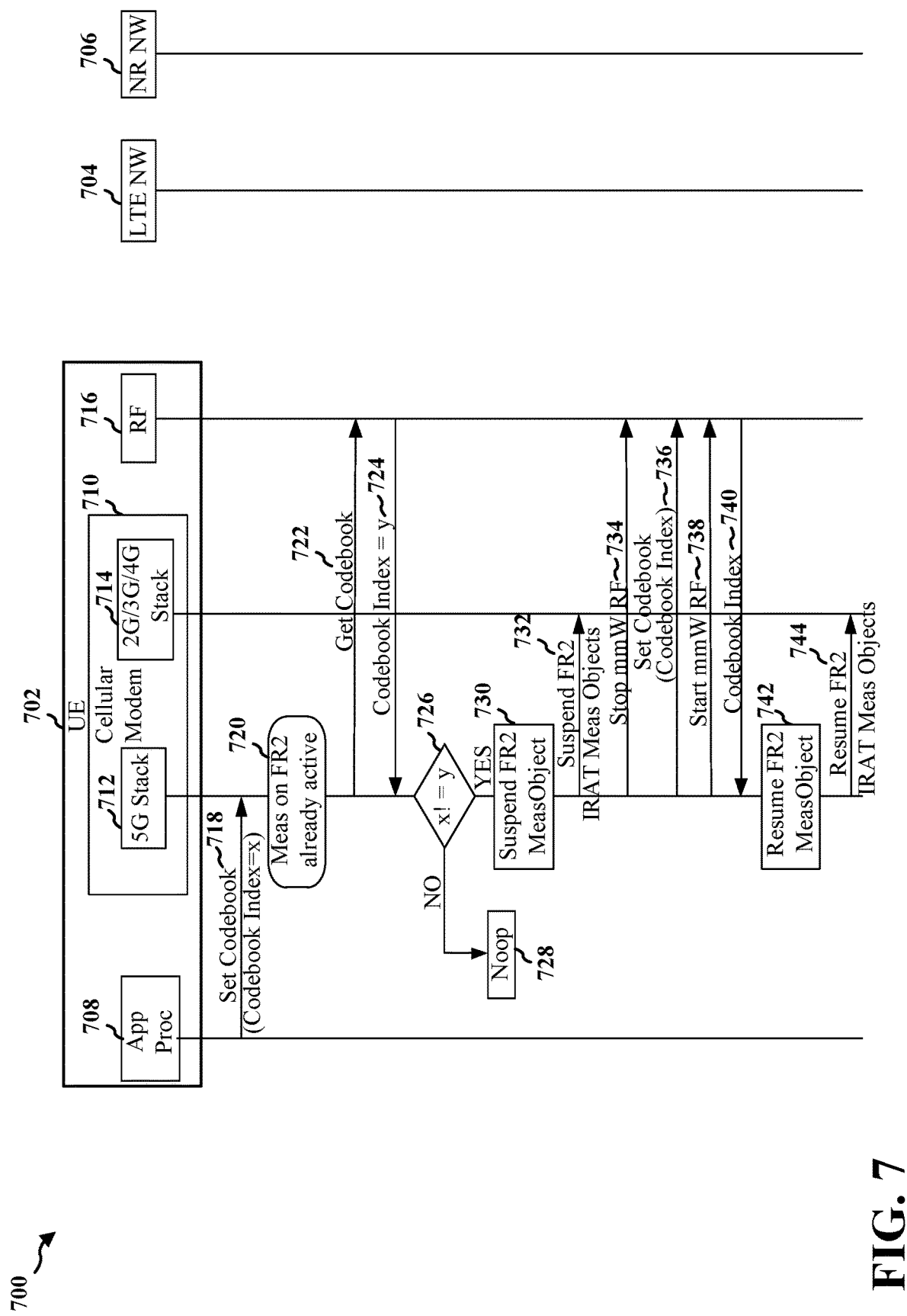
FIG. 7 is a diagram illustrating an example of updating a codebook in accordance with certain aspects of the disclosure.

FIG. 7 is a diagram illustrating an example 700 of a UE updating a codebook. The example 700 of FIG. 7 includes a UE 702, a first network 704 (e.g., LTE network), and a second network 706 (e.g., NR network). The UE 702 includes an application processor 708, a cellular modem 710 including a 5G stack 712 and a legacy stack 714 (e.g., 2G/3G/4G). The UE 702 further includes an RF component 716. The UE 702 may be the UE of case number 11 of Table 1.

In the example of FIG. 7, the UE may be actively measuring the FR2 link and may be configured to suspend measurements of the FR2 link in order to apply the new codebook. In some aspects, the application processor 708 may update the codebook by providing the codebook or codebook index 718 to the 5G stack 712 of the cellular modem 710. In the example, of FIG. 7, the codebook index 718 may be set to a value x. The 5G stack 712 may determine, at 720, that measurements of the FR2 link are currently active. The 5G stack 712 may then send a request (e.g., get codebook 722) to the RF component 716 for the current codebook index. The RF component 716 may send the value of the codebook index 724 to the 5G stack 712 in response to the request (e.g., get codebook 722). In the example of FIG. 7, the RF component 716 sends a codebook index 724 having a value of y.

The 5G stack 712, at 726, may determine whether the new codebook index 718 matches the codebook index 724 currently being utilized. In some aspects, for example, when the determination at 726 is false, such that the new codebook index 718 and codebook index 724 are equal, then no operation may be performed, at 728, such that the new codebook 718 is not applied. In some aspects, when the determination at 726 is true, such that the new codebook index 718 and codebook index 724 are not equal, then the 5G stack 712 proceeds with applying the new codebook index 718.

To apply the new codebook index 718, the 5G stack 712 may be configured, at 730, to suspend the measurements of the FR2 link. The 5G stack 712 may send a command 732 (e.g., suspend FR2 IRAT measurement objects) to the legacy stack 714 (e.g., 2G/3G/4G stack). The 5G stack 712 may then send a command 734 (e.g., stop mmW RF) to the RF component 716 to stop using the mmW RF connection. At which point, the 5G stack 712 may update the codebook by providing the codebook index 736 to the RF component 716. The 5G stack 712 then sends a command 738 (e.g., start mmW RF) to the RF component 716 to resume or restart communications on the mmW RF connection. The RF component 716 may also be configured to send, to the 5G stack 712, the codebook index 732 for synchronization, in response to the command 738. The RF component 716 sending the codebook index 732 to the 5G stack 712 may also verify that transmissions are based on the correct codebook.

The 5G stack 712 may be configured to resume, at 742, the FR2 measurements. FR2 measurements are resumed due to the 5G stack 712 send the indication 744 (e.g., resume FR2 IRAT measurement objects) to the legacy stack 714.

Figure 8:
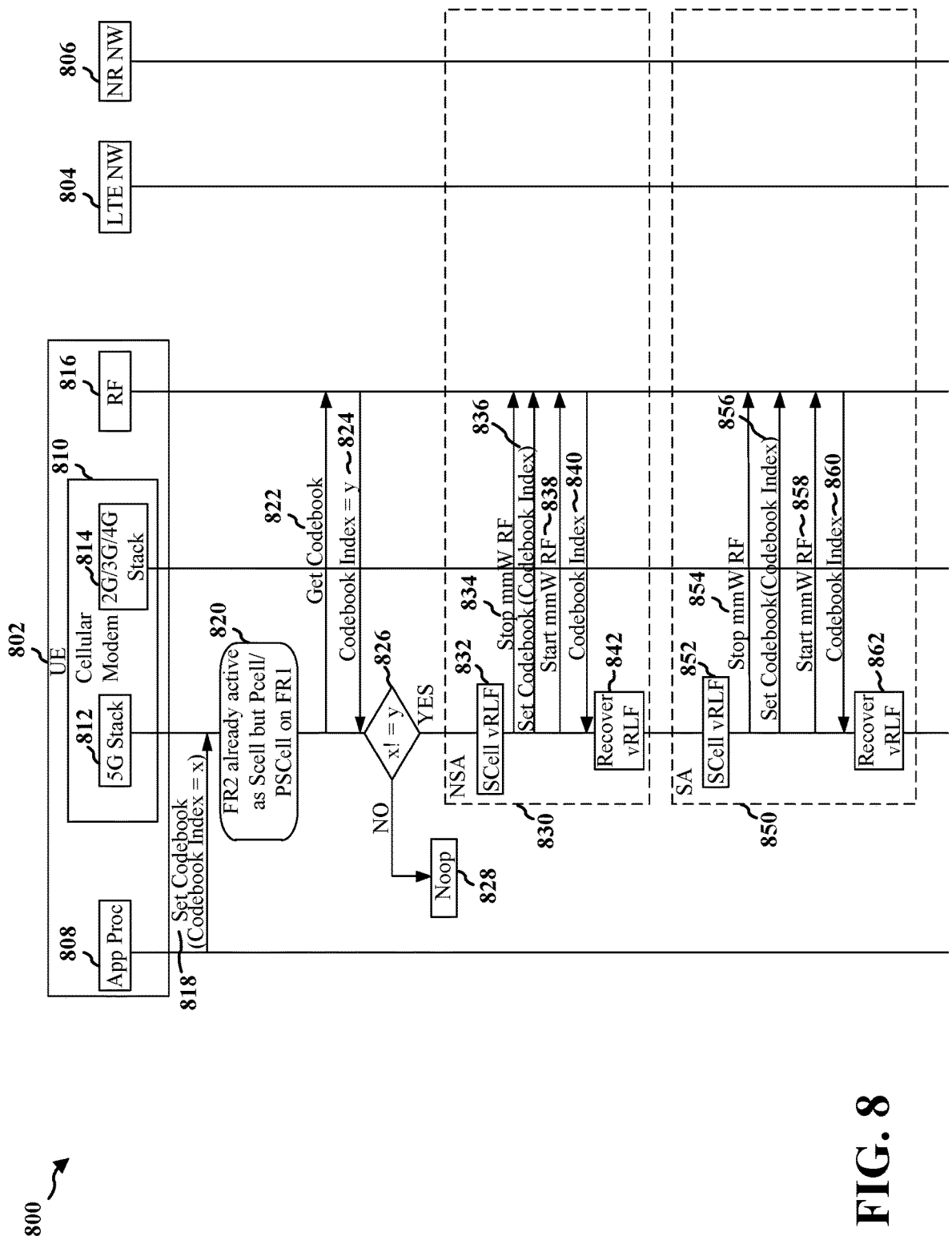
FIG. 8 is a diagram illustrating an example of updating a codebook in accordance with certain aspects of the disclosure.

FIG. 8 is a diagram illustrating an example 800 of a UE updating a codebook. The example 800 of FIG. 8 includes a UE 802, a first network 804 (e.g., LTE network), and a second network 806 (e.g., NR network). The UE 802 includes an application processor 808, a cellular modem 810 including a 5G stack 812 and a legacy stack 814 (e.g., 2G/3G/4G). The UE 802 further includes an RF component 816. The UE 802 may be the UE in case number 12 of Table 1.

In the example of FIG. 8, the UE may trigger a vRLF procedure in order to apply the new codebook. In some aspects, the application processor 808 may update the codebook by providing the codebook or codebook index 818 to the 5G stack 812 of the cellular modem 810. In the example, of FIG. 8, the codebook index 818 may be set to a value x. The 5G stack 812 may determine, at 820, that the FR2 link is already active as the SCell, while the PCell or primary secondary cell (PSCell) are operating or frequency range 1 (FR1) which is a sub-6 GHz frequency range. The 5G stack 812 may then send a request (e.g., get codebook 822) to the RF component 816 for the current codebook index. The RF component 816 may send the value of the codebook index 824 to the 5G stack 812 in response to the request (e.g., get codebook 822). In the example of FIG. 8, the RF component 816 sends a codebook index 824 having a value of y.

The 5G stack 812, at 826, may determine whether the new codebook index 818 matches the codebook index 824 current being utilized. In some aspects, for example, when the determination at 826 is false, such that the new codebook index 818 and codebook index 824 are the same, then no operation may be performed, at 828, such that the new codebook 818 is not applied. In some aspects, when the determination at 826 is true, such that the new codebook index 818 and codebook index 824 are not the same, then the 5G stack 812 proceeds with applying the new codebook index 818.

In some aspects, for example, when the UE is in the NSA mode 830, the 5G stack 812 may trigger, at 832, the vRLF procedure for the SCell in order to suspend SCell transmission and reception and apply the new codebook. The 5G stack 812 may send a command 834 (e.g., stop mmW RF) to the RF component 816 to stop using the mmW RF connection. The 5G stack 812 may follow by providing the updated codebook or codebook index 836 to the RF component 816. The 5G stack 812 may send a command (e.g., start mmW RF 838) to the RF component 816 to restart communications on the FR2 link. The RF component 816 may also be configured to send, to the 5G stack 812, the codebook index 840 for synchronization. The RF component 816 sending the codebook index 840 to the 5G stack 812 may also verify that transmissions are based on the correct codebook. The 5G stack may then recover from the vRLF procedure at 842 to resume SCell transmission and reception.

In some aspects, for example, when the UE is in the SA mode 850, the 5G stack 812 may trigger, at 852, the vRLF procedure for the SCell in order to apply the new codebook. The 5G stack 812 may send a command 854 (e.g., stop mmW RF) to the RF component 816 to stop using the mmW RF connection. The 5G stack 812 may follow by providing the updated codebook or codebook index 856 to the RF component 816. The 5G stack 812 may send a command (e.g., start mmW RF 858) to the RF component 816 to restart communications on the FR2 link. The RF component 816 may also be configured to send, to the 5G stack 812, the codebook index 860 for synchronization. The RF component 816 sending the codebook index 860 to the 5G stack 812 may also verify that transmissions are based on the correct codebook. The 5G stack may then recover from the vRLF procedure at 862.

Figure 9:
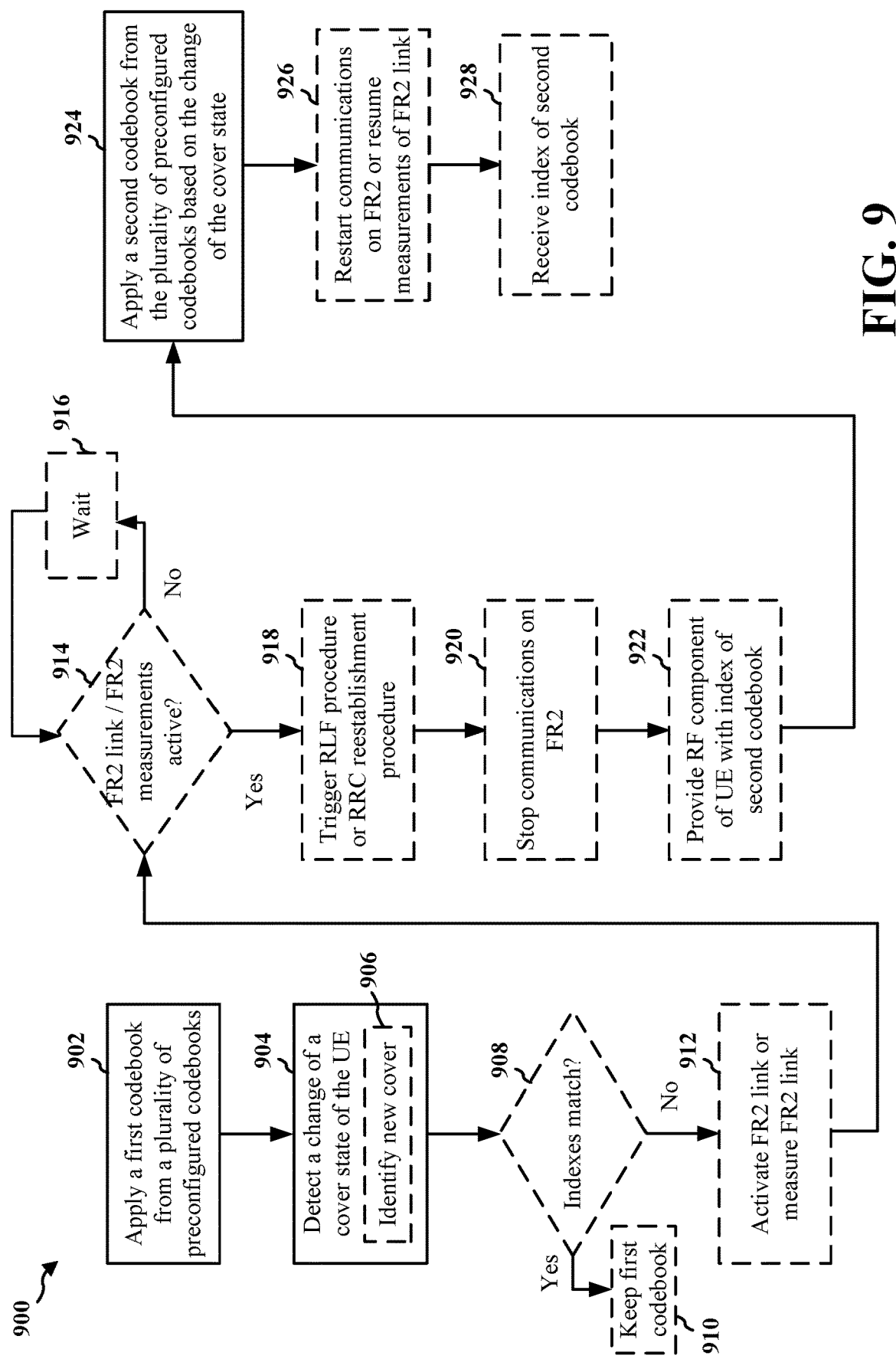
FIG. 9 is a flowchart of a method of wireless communication.

FIG. 9 is a flowchart 900 of a method of wireless communication. The method may be performed by a UE or a component of a UE (e.g., the UE 104, 350, 402, 502, 602, 702, 802; the apparatus 1002/1002'; the processing system 1114, which may include the memory 360 and which may be the entire UE 350 or a component of the UE 350, such as the TX processor 368, the RX processor 356, and/or the controller/processor 359). According to various aspects, one or more of the illustrated operations of the method 900 may be omitted, transposed, and/or contemporaneously performed. The UE may implement the method of diagrams 500, 600, 700, and/or 800. Optional aspects are illustrated with a dashed line. The method may enable a UE to change or update its codebook based on a changed state of the UE, such as but not limited to a change in the cover of the UE.

At 902, the UE may apply a first codebook. For example, 902 may be performed by first codebook component 1006 of apparatus 1002. The UE may apply the first codebook from a plurality of preconfigured codebooks. In some aspects, the UE may be provisioned with the plurality of preconfigured codebooks.

At 904, the UE may detect a change of a cover state of the UE. For example, 904 may be performed by cover state component 1008 of apparatus 1002. The change of the cover state of the UE may alter a transmission beam pattern at the UE. The altered transmission beam pattern of the UE may be accounted for by updating the codebook in response to the change of the cover state of the UE. In some aspects, the change of the cover state may include a change from a first cover to a second cover. In some aspects, the change of the cover state may include a change from a first cover to no cover. In some aspects, the change of the cover state may include a change from no cover to a first cover.

In some aspects, for example at 906, the UE may be configured to detect the change of the cover state by identifying a new cover of the UE. For example, 906 may be performed by new cover component 1010 of apparatus 1002. In such aspects, a second codebook may be applied based on the new cover being identified by the UE. In some aspects, the UE may be configured to identify the new cover by receiving an input signal (e.g., 410) from a sensor which may be configured to detect the new cover and indicate the appropriate codebook configuration that may correspond to the new cover.

At 908, the UE may determine whether a stored index for the first codebook is identical to a second codebook index. For example, 908 may be performed by stored index component 1012 of apparatus 1002. In some aspects, such as when the UE determines that the stored index for the first codebook is identical to the second codebook index, the UE may be configured, at 910, to keep the first codebook. However, in aspects when the UE determines that the stored index for the first codebook is not identical to the second codebook index, the UE may be configured to apply the second codebook.

At 912, the UE may be configured to activate an FR2 link. For example, 912 may be performed by activation component 1014 of apparatus 1002. In some aspects, the UE may be configured to measure the FR2 link.

At 914, the UE may determine whether a FR2 link is active. For example, 914 may be performed by determination component 1016 of apparatus 1002. In some aspects, the UE may determine whether measurements of the FR2 link are active. In aspects when the FR2 link is not active, the UE, at 916, may wait to apply the second codebook. In aspects when measurements of the FR2 link are not active, the UE may wait to apply the second codebook. The UE may wait for the FR2 link to be active or for measurements of the FR2 link to be active in order to apply the second codebook.

At 918, the UE may trigger a RLF procedure in order to implement the second codebook. For example, 918 may be performed by trigger component 1018 of apparatus 1002. The second codebook may be applied following the RLF procedure. In some aspects, the UE may trigger a SCG failure or a RRC reestablishment procedure in order to implement the second codebook. The second codebook may be applied following the SCG failure or the RRC reestablishment procedure. In some aspects, the UE may determine to trigger the RLF procedure, the SCG failure, or the RRC reestablishment procedure based on an FR2 link being active or based on measurements of the FR2 link being active. In some aspects, the UE may trigger a vRLF procedure on a SCell when the FR2 link is active on the SCell. The UE triggering the vRLF procedure allows the second codebook to be applied following the completion of the vRLF procedure.

At 920, the UE may be configured to stop FR2 transmissions. For example, 920 may be performed by stop component 1020 of apparatus 1002. The UE may stop FR2 transmissions in order to apply the second codebook. In some aspects, the UE may suspend measurements of the FR2 link by suspending inter-radio access technology (IRAT) measurements of the FR2 link. In some aspects, the UE may stop FR2 communication at a RF component of the UE. In some aspects, the vRLF procedure may include stopping FR2 communications on the SCell.

At 922, the UE may provide a RF component of the UE with an index for the second codebook. For example, 922 may be performed by provide component 1022 of apparatus 1002. Providing the index for the second codebook to the RF component allows the UE to indicate which codebook of the preconfigured codebooks is to be applied at the RF component of the UE, in order to update the codebook of the UE. In some aspects, the vRLF procedure may include providing the index for the second codebook to the RF component of the UE.

At 924, the UE may apply the second codebook from the plurality of preconfigured codebooks based on the change of the cover state. For example, 924 may be performed by second codebook component 1024 of apparatus 1002. In some aspects, the UE may determine when to apply the second codebook based on at least one of a modem state, a RAT, a RLF, a RRC state, a SA or NSA state, a global system for mobile communications (GSM) wide-band code-division multiple access (WCDMA) time division synchronous code division multiple access (TDSCDMA) (GWT), or a SIM state.

At 926, the UE may resume or restart communicating based on FR2. For example, 926 may be performed by restart component 1026 of apparatus 1002. In some aspects, the UE may resume the measurements of the FR2 link after the application of the second codebook has begun. In some aspects, the UE may restart the FR2 communication at the RF component based on the second codebook. In some aspects, the vRLF procedure may include restarting the FR2 communication on the SCell after the second codebook index has been provided to the RF component of the UE.

At 928, the UE may receive the index for the second codebook from the RF component of the UE. For example, 928 may be performed by index component 1028 of apparatus 1002. In some aspects, the UE may receive an indication of the index for the second codebook from the RF component of the UE following the RLF procedure of the RRC reestablishment. In some aspects, the UE may receive an indication of the index of the second codebook from the RF component after restarting the FR2 communication based on the second codebook. In some aspects, the vRLF procedure may include receiving an indication of the second codebook from the RF component of the UE. Receiving the index for the second codebook, the indication of the index for the second codebook, or the indication of the index of the second codebook from the RF component of the UE may be utilized as a manner to verify or confirm that the restarted FR2 communications or measurements of the FR2 link are based on the second codebook.

Figure 10:
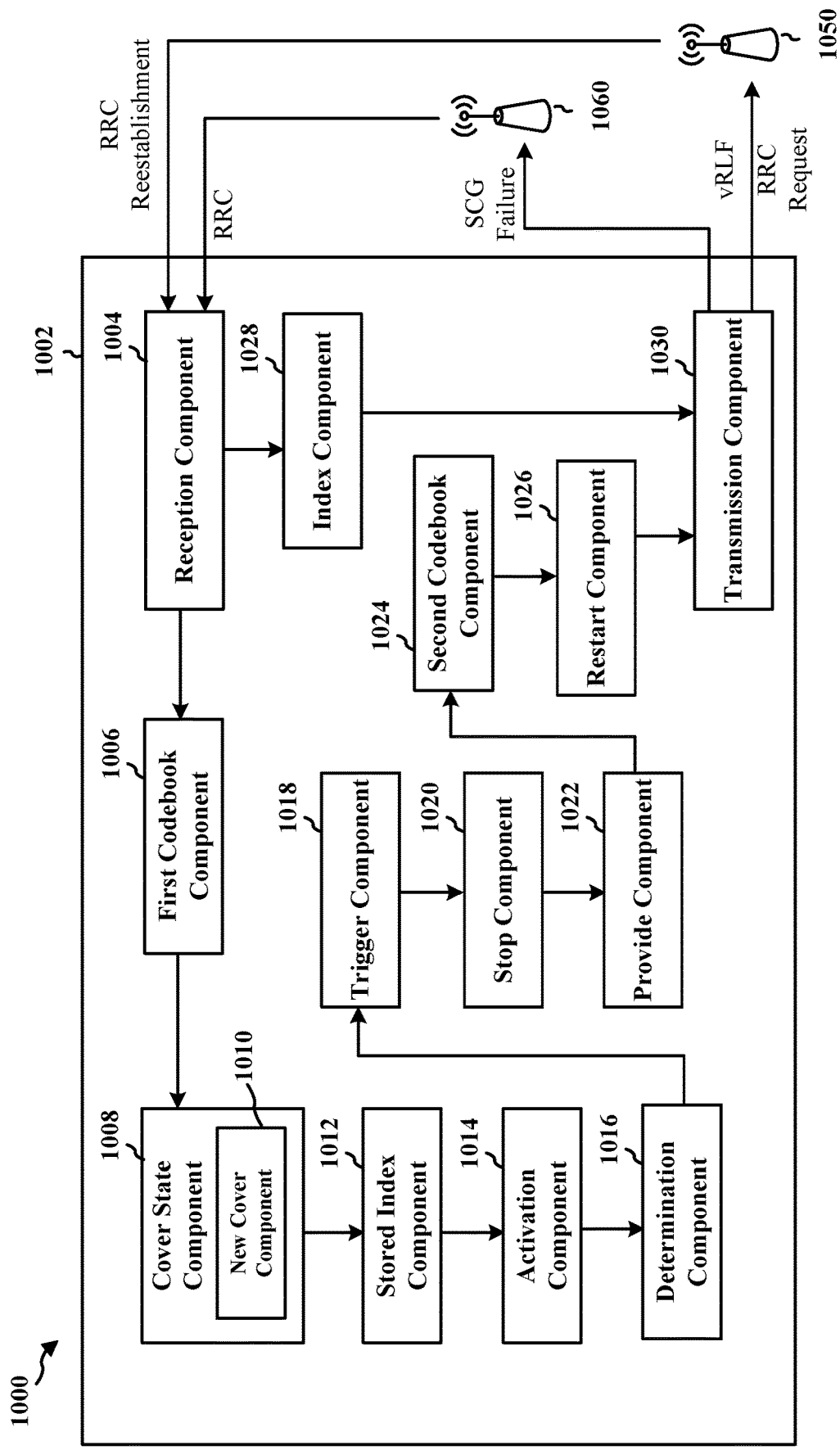
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus may perform the method for flowchart 900. The apparatus includes a reception component 1004 that may be configured to receive various types of signals/messages and/or other information from other devices, including, for example, the base station 1050 and the base station 1060. The base station 1050 may operate based on a first RAT, while the base station 1060 may operation based on a second RAT. The apparatus includes a first codebook component 1006 that may be configured to apply a first codebook from a plurality of preconfigured codebooks, e.g., as described in connection with 902 of FIG. 9. The apparatus includes a cover state component 1008 that may be configured to detect a change of a cover state of the UE, e.g., as described in connection with 904 of FIG. 9. The apparatus may include a new cover component 1010 that may be configured to identify a new cover of the UE, e.g., as described in connection with 906 of FIG. 9. The apparatus includes a stored index component 1012 that may determine whether a stored index for the first codebook is identical to a second codebook index, e.g., as described in connection with 908 of FIG. 9. The apparatus includes an activation component 1014 that may be configured to activate an FR2 link or measure the FR2 link, e.g., as described in connection with 912 of FIG. 9. The apparatus includes a determination component 1016 that may determine whether a FR2 link is active or whether measurements of the FR2 link are active, e.g., as described in connection with 914 of FIG. 9. The apparatus includes a trigger component 1018 that may trigger a RLF procedure, a SCG failure, or a RRC reestablishment procedure in order to implement the second codebook, e.g., as described in connection with 918 of FIG. 9. The apparatus includes a stop component 1020 that may be configured to stop FR2 transmissions or suspend measurements of the FR2 link, e.g., as described in connection with 920 of FIG. 9. The apparatus includes a provide component 1022 that may provide the RF component of the UE with the index for the second codebook, e.g., as described in connection with 922 of FIG. 9. The apparatus includes a second codebook component 1024 that may apply the second codebook from the plurality of preconfigured codebooks based on the change of the cover state, e.g., as described in connection with 924 of FIG. 9. The apparatus includes a restart component 1026 that may be configured to resume or restart communicating based on FR2 or may resume the measurements of the FR2 link, e.g., as described in connection with 926 of FIG. 9. The apparatus includes an index component 1028 that may receive the index for the second codebook from the RF component of the UE, e.g., as described in connection with 928 of FIG. 9. The apparatus includes a transmission component 1030 that may be configured to transmit various types of signals/messages and/or other information to other devices, including, for example, the base station 1050 and/or the base station 1060.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
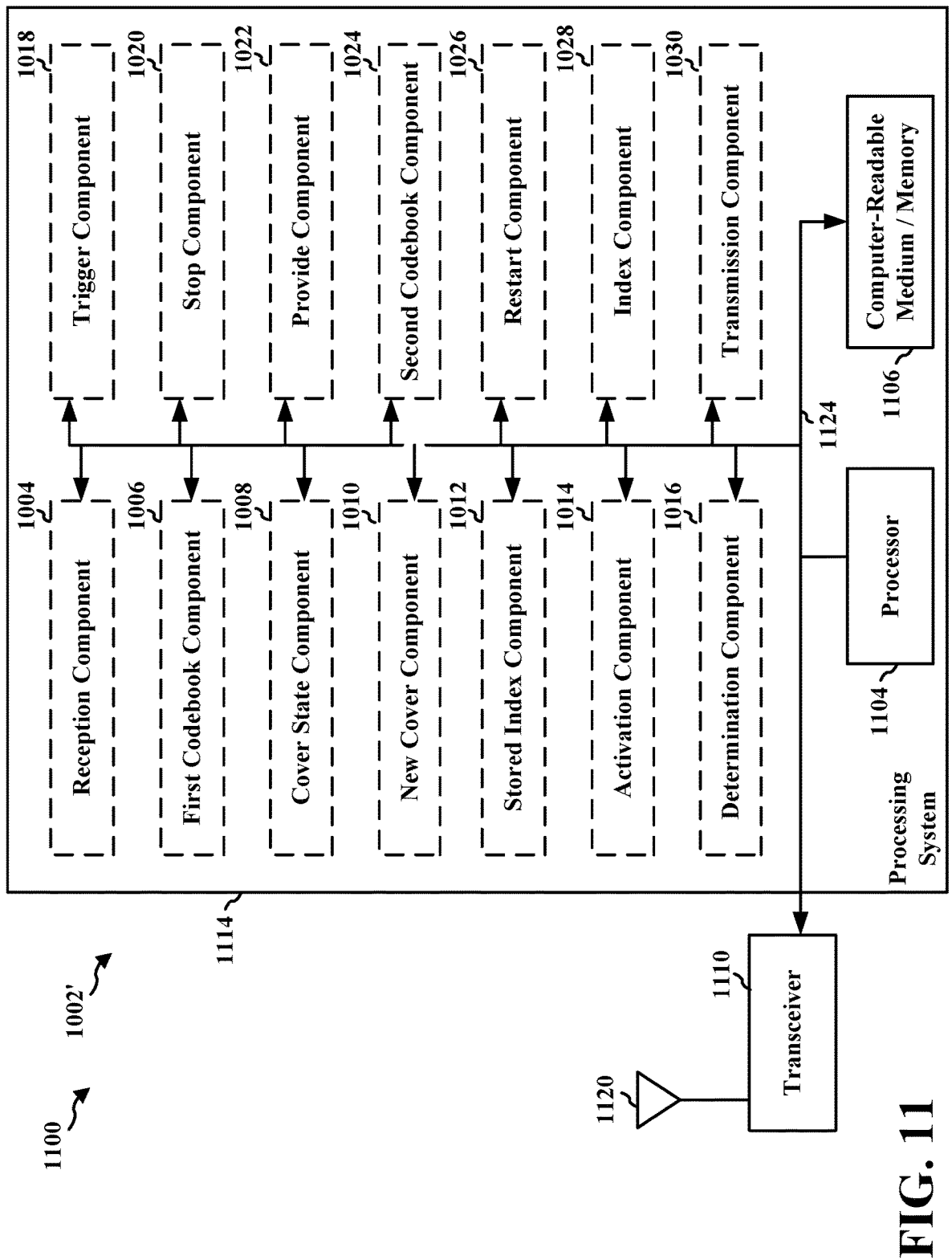
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The apparatus may be a UE, or a portion thereof. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, 1024, 1026, 1028, 1030, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1030, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022, 1024, 1026, 1028, 1030. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for applying a first codebook from a plurality of preconfigured codebooks. The apparatus includes means for detecting a change of a cover state of the UE. The change of the cover state may alter a transmission beam pattern at the UE. The apparatus includes applying a second codebook from the plurality of preconfigured codebooks based on the change of the cover state. The apparatus may further include means for identifying a new cover of the UE. The second codebook is further applied based on the new cover that is identified by the UE. The apparatus may further include means for determining whether a FR2 link is active or whether measurements of the FR2 link are active. The apparatus may further include means for applying the second codebook when the FR2 link is active or the measurements of the FR2 link are active. The apparatus may further include means for waiting to apply the second codebook when the FR2 link is not active or the measurements of the FR2 link are not active. The apparatus may further include means for activating the FR2 link or measuring the FR2 link. The apparatus may further include means for communicating based on the FR2 link. The apparatus may further include means for receiving an index for the second codebook from a RF component of the UE. The apparatus may further include means for triggering a RLF procedure, SCG failure, or a RRC reestablishment procedure in order to implement the second codebook. The second codebook applied following the radio link failure procedure or the RRC reestablishment procedure. The apparatus may further include means for determining whether a stored index for the first codebook is identical to a second codebook index. The apparatus may further include means for applying the second codebook when the stored index for the first codebook and the second codebook index are not identical. The apparatus may further include means for stopping FR2 transmissions. The apparatus may further include means for providing a RF component of the UE with an index for the second codebook. The apparatus may further include means for receiving an indication of the index for the second codebook from the RF component following the radio link failure procedure or the RRC reestablishment procedure. The apparatus may further include means for suspending measurements of the FR2 link by suspending IRAT measurements of the FR2 link. The apparatus may further include means for resuming the measurements of the FR2 link after beginning to apply the second codebook. The apparatus may further include means for stopping FR2 communication at a RF component. The apparatus may further include means for providing the RF component with an index of the second codebook. The apparatus may further include means for restarting the FR2 communication at the RF component based on the second codebook. The apparatus may further include means for receiving an indication of the index of the second codebook from the RF component after restarting the FR2 communication based on the second codebook. The apparatus may further include means for triggering a vRLF procedure on a SCell. The FR2 link is active on the SCell. The second codebook is applied following the triggering the vRLF procedure. The apparatus may further include means for stopping FR2 communication on the SCell. The apparatus may further include means for providing an index for the second codebook to a RF component of the UE. The apparatus may further include means for restarting the FR2 communication on the SCell after the index for the second codebook is provided to the RF component. The apparatus may further include means for receiving an indication of the second codebook from the RF component. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure relates to updating the codebook configuration in response to a change of a cover state of a UE. Aspects presented herein provide a solution to the problem of updating the codebook configuration upon the changing of the cover or case of the UE. The configuration of the codebook may depend on many different factors, such as but not limited to the cover or case of the UE. Users that change the cover or case of the UE may affect the mmW transmission or possibly stop mmW transmission and reception, which may affect the codebook configuration. At least one advantage of the disclosure is that the codebook can be easily updated without negatively impacting the network.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    applying a first codebook from a plurality of preconfigured codebooks;
    detecting a change of a cover state of the UE, wherein the change alters a transmission beam pattern at the UE;
    determining whether a frequency range 2 (FR2) link or a measurement of the FR2 link is active;
    applying a second codebook from the plurality of preconfigured codebooks based on the change of the cover state and responsive to determining the FR2 link or the measurement of the FR2 link is active; and
    waiting to apply the second codebook responsive to determining the FR2 link or the measurement of the FR2 link is not active, until a time when the FR2 link or the measurement of the FR2 link is active.

2. The method of claim 1, wherein detecting the change of the cover state further comprises:
    identifying a new cover of the UE, wherein the second codebook is further applied based on the new cover identified by the UE.

3. The method of claim 1, further comprising:
    activating the FR2 link or measuring the FR2 link;
    communicating based on the FR2 link; and
    receiving an index for the second codebook from a radio frequency (RF) component of the UE.

4. The method of claim 1, further comprising:
    triggering a radio link failure procedure, a secondary cell group (SCG) failure or a radio resource control (RRC) reestablishment procedure to implement the second codebook, wherein the second codebook is applied following the corresponding radio link failure procedure, SCG failure or RRC reestablishment procedure.

5. The method of claim 4, further comprising:
    determining whether a stored index for the first codebook is identical to a second codebook index; and
    applying the second codebook responsive to determining the stored index for the first codebook and the second codebook index are not identical.

6. The method of claim 4, further comprising:
    stopping frequency range 2 (FR2) transmissions;
    providing a radio frequency (RF) component of the UE with an index for the second codebook; and
    receiving an indication of the index for the second codebook from the RF component following the radio link failure procedure or the RRC reestablishment procedure.

7. The method of claim 1, further comprising:
    suspending measurements of the frequency range 2 (FR2) link by suspending inter-radio access technology (IRAT) measurements of the FR2 link; and
    resuming the measurements of the FR2 link after beginning to apply the second codebook.

8. The method of claim 1, further comprising:
    triggering a virtual radio link failure (VRLF) procedure on a secondary cell (SCell), wherein a frequency range 2 (FR2) link is active on the SCell, wherein the second codebook is applied following the triggering the VRLF procedure.

9. The method of claim 8, wherein the VRLF procedure includes:
    stopping FR2 communication on the SCell;
    providing an index for the second codebook to a radio frequency (RF) component of the UE;
    restarting the FR2 communication on the SCell after the index for the second codebook is provided to the RF component; and
    receiving an indication of the second codebook from the RF component.

10. An apparatus for wireless communication, comprising:
    means for applying a first codebook from a plurality of preconfigured codebooks;
    means for detecting a change of a cover state of the UE, wherein the change alters a transmission beam pattern at the UE;
    means for applying a second codebook from the plurality of preconfigured codebooks based on the change of the cover state; and
    means for triggering a radio link failure procedure, a secondary cell group (SCG) failure or a radio resource control (RRC) reestablishment procedure in order to implement the second codebook, wherein the second codebook is applied following the corresponding radio link failure procedure, SCG failure or RRC reestablishment procedure.

11. The apparatus of claim 10, wherein detecting the change of the cover state further comprises:
means for identifying a new cover of the UE, wherein the second codebook is further applied based on the new cover that is identified by the UE.

12. The apparatus of claim 10, wherein the UE determines to trigger the radio link failure procedure, the SCG failure or the RRC reestablishment procedure based on a frequency range 2 (FR2) link being active or measurements of the FR2 link being active.

13. The apparatus of claim 10, further comprising:
means for suspending measurements of a frequency range 2 (FR2) link by suspending inter-radio access technology (IRAT) measurements of the FR2 link; and
means for resuming the measurements of the FR2 link after beginning to apply the second codebook.

14. The apparatus of claim 10, further comprising:
means for triggering a virtual radio link failure (VRLF) procedure on a secondary cell (SCell), wherein a frequency range 2 (FR2) link is active on the SCell, wherein the second codebook is applied following the triggering the VRLF procedure.

15. An apparatus for wireless communication, comprising:
a memory; and
at least one processor coupled to the memory and configured to:
apply a first codebook from a plurality of preconfigured codebooks;
determine whether a frequency range 2 (FR2) link or a measurement of the FR2 link is active;
detect a change of a cover state of the UE, wherein the change alters a transmission beam pattern at the UE; and
apply a second codebook from the plurality of preconfigured codebooks based on the change of the cover state and responsive to determining the FR2 link or the measurement of the FR2 is active; and
wait to apply the second codebook responsive to determining the FR2 link or the measurement of the FR2 link is not active, until a time when the FR2 link or the measurement of the FR2 link is active.

16. The apparatus of claim 15, wherein to detect the change of the cover state the at least one processor further configured to:
identify a new cover of the UE, wherein the second codebook is further applied based on the new cover identified by the UE.

17. The apparatus of claim 15, the at least one processor further configured to:
activate the FR2 link or measure the FR2 link;
communicate based on the FR2 link; and
receive an index for the second codebook from a radio frequency (RF) component of the UE.

18. The apparatus of claim 15, the at least one processor further configured to:
trigger a radio link failure procedure, a secondary cell group (SCG) failure or a radio resource control (RRC) reestablishment procedure to implement the second codebook, wherein the second codebook is applied following the radio link failure procedure, the SCG failure or the RRC reestablishment procedure.

19. The apparatus of claim 18, the at least one processor further configured to:
determine whether a stored index for the first codebook is identical to a second codebook index; and
apply the second codebook responsive to determining the stored index for the first codebook and the second codebook index are not identical.

20. The apparatus of claim 18, the at least one processor further configured to:
stop frequency range 2 (FR2) transmissions;
provide a radio frequency (RF) component of the UE with an index for the second codebook; and
receive an indication of the index for the second codebook from the RF component following the radio link failure procedure or the RRC reestablishment procedure.

21. The apparatus of claim 15, the at least one processor further configured to:
suspend measurements of the frequency range 2 (FR2) link by suspending inter-radio access technology (IRAT) measurements of the FR2 link; and
resume the measurements of the FR2 link after beginning to apply the second codebook.

22. The apparatus of claim 15, the at least one processor further configured to:
trigger a virtual radio link failure (VRLF) procedure on a secondary cell (SCell), wherein a frequency range 2 (FR2) link is active on the SCell, and wherein the second codebook is applied following the triggering the VRLF procedure.

23. The apparatus of claim 22, wherein to perform the VRLF procedure the at least one processor is further configured to:
stop FR2 communication on the SCell;
provide an index for the second codebook to a radio frequency (RF) component of the UE;
restart the FR2 communication on the SCell after the index for the second codebook is provided to the RF component; and
receive an indication of the second codebook from the RF component.

24. A non-transitory computer-readable medium storing computer executable code, the code when executed by a processor cause the processor to:
apply a first codebook from a plurality of preconfigured codebooks;
detect a change of a cover state of the UE, wherein the change alters a transmission beam pattern at the UE;
determine whether a frequency range 2 (FR2) link or a measurement of the FR2 link is active;
apply a second codebook from the plurality of preconfigured codebooks based on the change of the cover state and responsive to determining the FR2 link or the measurement of the FR2 link is active; and
wait to apply the second codebook responsive to determining the FR2 link or the measurement of the FR2 link is not active, until a time when the FR2 link or the measurement of the FR2 link is active.

25. The computer-readable medium of claim 24, wherein the code to detect a change of a cover state further comprises code to identify a new cover of the UE, wherein the second codebook is further applied based on the new cover identified by the UE.

26. The computer-readable medium of claim 24, further comprising code to:
   activate the FR2 link or measuring the FR2 link;
   communicate based on the FR2 link; and
   receive an index for the second codebook from a radio frequency (RF) component of the UE.

\* \* \* \* \*